United States Patent
Hwang et al.

(10) Patent No.: US 9,538,454 B2
(45) Date of Patent: Jan. 3, 2017

(54) EXTENDED ACCESS BARRING AND NETWORK SHARING

(75) Inventors: Woonhee Hwang, Espoo (FI); Lei Du, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 35 days.

(21) Appl. No.: 14/237,934

(22) PCT Filed: Aug. 8, 2011

(86) PCT No.: PCT/EP2011/063644
§ 371 (c)(1),
(2), (4) Date: Feb. 10, 2014

(87) PCT Pub. No.: WO2013/020582
PCT Pub. Date: Feb. 14, 2013

(65) Prior Publication Data
US 2014/0171096 A1    Jun. 19, 2014

(51) Int. Cl.
| | | |
|---|---|---|
| *H04W 72/00* | (2009.01) | |
| *H04W 48/06* | (2009.01) | |
| *H04W 48/02* | (2009.01) | |
| *H04W 48/10* | (2009.01) | |
| *H04W 88/10* | (2009.01) | |
| *H04W 92/04* | (2009.01) | |

(52) U.S. Cl.
CPC .............. *H04W 48/06* (2013.01); *H04W 48/02* (2013.01); *H04W 48/10* (2013.01); *H04W 88/10* (2013.01); *H04W 92/045* (2013.01)

(58) Field of Classification Search
CPC ..................................................... H04W 24/00
See application file for complete search history.

(56) References Cited

U.S. PATENT DOCUMENTS

2011/0317661 A1* 12/2011 Tenny ............... H04W 36/0022
370/331
2014/0036669 A1* 2/2014 Yang .................. H04N 21/2365
370/230

FOREIGN PATENT DOCUMENTS

EP      1 912 461 A2    4/2008

OTHER PUBLICATIONS

3GPP TSG GERAN2 AdHoc on MTC, Bratislava, Slovakia, Apr. 14-15, 2011, G2-110010, "Comments on Realization of EAB", Renesas Electronics Europe, 3 pgs.
3GPP TSG GERAN2#49bis, Bratislava, Apr. 14-15, 2011, G2-110018, "Indicating EAB Support on BCCH", Telefon AB LM Ericsson, ST-Ericsson, 14 pgs.
3GPP TSG GERAN2 Ad-Hoc on MTC, Bratislava, Slovenia, Apr. 14-15, 2011, Tdoc GS-110026, "Mechanism to signal if network broadcasts Si 21", Qualcomm Inc., 4 pgs.

(Continued)

*Primary Examiner* — Justin Lee
(74) *Attorney, Agent, or Firm* — Harrington & Smith

(57) ABSTRACT

It is provided an apparatus, including base station means adapted to provide a base station functionality for a first user equipment attached to a first network and a second user equipment attached to a second network different from the first network; access barring broadcasting means adapted to broadcast, via the base station means, a first EAB parameter including a first category indication for extended access barring related to the first network and a second category indication for extended access barring related to the second network.

18 Claims, 7 Drawing Sheets

(56) References Cited

OTHER PUBLICATIONS

3GPP TSG RAN WG2 Meeting #74, Barcelona, Spain, May 9-13, 2011, R2-113217, "EAB for RAN overload protection", Intel Corp., 4 pgs.

3GPP TSG-RAN WG2 #74, Barcelona, Spain, May 9-13, 2011, R2-113339, "Further Discussion on EAB", LG Electronics Inc., 5 pgs.

3GPP TSG-GERAN #50, Dallas, Texas, May 16-20, 2011, GP-110973, "Realizing Extended Access Barring", Telefon AB LM Ericsson, et al., 20 pgs.

3GPP TSG-SA WG1 Meeting #54, Xi'an, China, May 9-13, 2011, S1-111376, "Clarification on how EAB is applied in Shared network", 3 pgs.

3GPP TS22.011 V11.0.0 (Jun. 2011), "$3^{rd}$ Generation Partnership Project; Technical Specification Group Services and System Aspects; Service accessibility (Release 11)", 26 pgs.

3GPP TS 23.122 V12.3.0 (Dec. 2013), "$3^{rd}$ Generation Partnership Project; Technical Specification Group Core Network and Terminals; Non-Acess-Stratum (NAS) functions related to Mobile Station (MS) in idle mode (Release 12)", 45 pgs.

3GPP TS 24.301 V12.3.0 (Dec. 2013), "$3^{rd}$ Generation Partnership Project; Technical Specification Group Core Network and Terminals; Non-Access-Stratum (NAS) protocol for Evolved Packet System (EPS); Stage 3 (Release 12)", 353 pgs.

\* cited by examiner

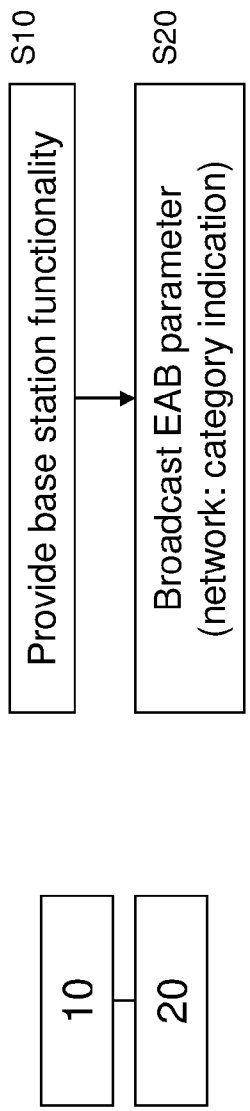
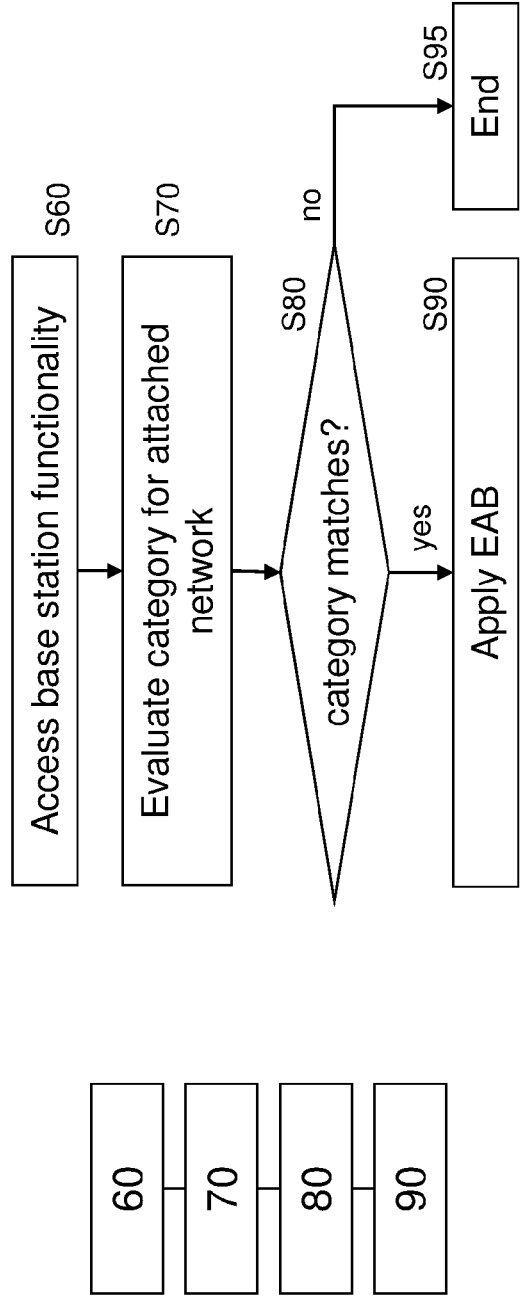

```
SystemInformationBlockType1 ::=    SEQUENCE {
    cellAccessRelatedInfo          SEQUENCE {
        plmn-IdentityList              PLMN-IdentityList,
        trackingAreaCode               TrackingAreaCode,
        cellIdentity                   CellIdentity,
        cellBarred                     ENUMERATED {barred, notBarred},
        intraFreqReselection           ENUMERATED {allowed, notAllowed},
        csg-Indication                 BOOLEAN,
        csg-Identity                   CSG-Identity             OPTIONAL    -- Need OR
    },
    cellSelectionInfo              SEQUENCE {

PLMN-IdentityList ::=  SEQUENCE (SIZE (1..6)) OF PLMN-IdentityInfo
PLMN-IdentityInfo ::=  SEQUENCE {
    plmn-Identity                  PLMN-Identity,
    cellReservedForOperatorUse     ENUMERATED {reserved, notReserved}
}

PLMN-Identity ::=              SEQUENCE {
    mcc                            MCC                          OPTIONAL,   -- Cond MCC
    mnc                            MNC
}

MCC ::=                        SEQUENCE (SIZE (3)) OF
                               MCC-MNC-Digit
MNC ::=                        SEQUENCE (SIZE (2..3)) OF
                               MCC-MNC-Digit
MCC-MNC-Digit ::=              INTEGER (0..9)
```

Fig. 8

```
RRCConnectionSetupComplete-r8-IEs ::= SEQUENCE {
    selectedPLMN-Identity       INTEGER (1..6),
    registeredMME               RegisteredMME                           OPTIONAL,
    dedicatedInfoNAS            DedicatedInfoNAS,
    nonCriticalExtension        RRCConnectionSetupComplete-v8a0-IEs     OPTIONAL
}
```

Fig. 9

```
SystemInformationBlockType2 ::=    SEQUENCE {
    ac-BarringInfo                 SEQUENCE {
        ac-BarringForEmergency         BOOLEAN,
        ac-BarringForMO-Signaling      AC-BarringConfig            OPTIONAL,  -- Need OP
        ac-BarringForMO-Data           AC-BarringConfig            OPTIONAL,  -- Need OP
    }                                                              OPTIONAL,  -- Need OP AC-BarringConfig ::=    SEQUENCE {
    ac-BarringFactor        ENUMERATED {
                                p00, p05, p10, p15, p20, p25, p30, p40,
                                p50, p60, p70, p75, p80, p85, p90, p95},
    ac-BarringTime          ENUMERATED {s4, s8, s16, s32, s64, s128, s256, s512},
    ac-BarringForSpecialAC  BIT STRING (SIZE(5))
}
```

Fig. 10

```
EAB-BarringConfig ::=      SEQUENCE {
   eab-BarringFactor         ENUMERATED {
                               p00, p05, p10, p15, p20, p25, p30, p40,
                               p50, p60, p70, p75, p80, p85, p90, p95},
   eab-BarringTime           ENUMERATED {s4, s8, s16, s32, s64, s128, s256, s512},
   eab-BarringForSpecialAC   BIT STRING (SIZE(5))
   eab-PLMN-List ::=         SEQUENCE (SIZE (1..6)) OF UE-EAB-Category
}

UE-EAB-Category             ENUMERATED {categ-a, categ-b, categ-c, spare}
```

EXTENDED ACCESS BARRING AND NETWORK SHARING

FIELD OF THE INVENTION

The present invention relates to an apparatus, a method, a system, and a computer program product related to extended access barring. More particularly, the present invention relates to an apparatus, a method, a system, and a computer program product for extended access barring in a network sharing case.

BACKGROUND OF THE INVENTION

Abbreviations
3GPP 3$^{rd}$ generation partnership project
AC Access Class
ACB Access Class Barring
AS Access Stratum
E-UTRAN Evolved UTRAN
eNodeB, eNB Evolved NodeB
EAB Extended Access Barring
EDGE Enhanced Data Rates for GSM Evolution
GERAN GSM Edge RAN
GSM Global system for mobile communication
IE Information element
MME Mobility Management Entity
MMEGI MME group identity
MMEC MME code
MTC Machine Type Communication
NAS Non Access Stratum
PLMN Public Land Mobile Network
RAN Radio Access Network
RRC radio resource control
SIB System Information Block
UE User equipment (same as terminal)
UL UpLink
UTRAN Universal Terrestrial Radio Access Network The present application is related to extended access barring (EAB). 3GPP is discussing EAB as a mean to bar the UEs in overload situations. The requirements are captured in 3GPP TS 22.011 V11.0.0. (chapter 4.3.4).

EAB should be applied depending on the category where UE belongs to and this category is up to the PLMN registration situation as following;
  a) UEs that are configured for EAB;
  b) UEs that are configured for EAB and are neither in their HPLMN nor in a PLMN that is equivalent to it;
  c) UEs that are configured for EAB and are neither in the PLMN listed as most preferred PLMN of the country where the UE is roaming in the operator-defined PLMN selector list on the SIM/USIM, nor in their HPLMN nor in a PLMN that is equivalent to their HPLMN.

Above categories are designed as many MTC devices are roamers.

For instance, in some MTC application, MTC devices are using roamer SIM/USIM with preferred PLMN. That means Operator-A in country-1 gives Operator-A's SIM card of country-2 to its MTC devices in country-1. So all the MTC devices are actually roamers in country-1 but PLMN of Operator-A in country-1 will be the most preferred PLMN. Thus above category is important to bar separately between all the roamers (b) and roamers which are not in the most preferred PLMN(c). In the above example, if Operator-B's network node, which is serving the same area as Operator-A's network node, is breaking down, all Operator-B's MTC devices will try to roam to Operator-A's system and this will cause overload to Operator-A as well. However if there is no separation of category c) from b), network bars all roamer with b), Operator-A's own MTC devices cannot be served either. Thus in this case, category c) barring can be used only to bar the Operator-B's MTC devices.

However, in case that network sharing is used in the network, it is not clear how EAB should be applied and how EAB related parameters should be broadcast. If the E-UTRAN is shared by multiple operators, the system information broadcasted in each shared cell contains the PLMN-id of each operator (according to current specifications up to 6 PLMN-ids), i.e. PLMN-IdentityList as in FIG. 8. The UE shall read up the PLMN-ids to select one of the PLMN-ids during PLMN selection procedure and to indicate this PLMN-id to the E-UTRAN via RRC Connection Setup Complete message. The E-UTRAN then selects an appropriate MME for the PLMN indicated by the UE.

FIG. 8 explains parameters related to network sharing in pseudo-code language.

In case the network broadcasts multiple PLMN_IDs, UE AS layer will forward them to NAS layer and NAS layer will select one. And NAS layer will indicate this selected PLMN to AS layer and AS layer will include it in the corresponding RRCConnection Setup Complete message as shown in FIG. 9.

Basically, the content of the RRCConnectionSetupComplete message is set as follows:

```
1> set the content of RRCConnectionSetupComplete message as follows:
    2>      set the selectedPLMN-Identity to the PLMN selected
            by upper layers (see TS 23.122, TS 24.301) from the PLMN(s)
            included in the plmn-IdentityList in
            SystemInformationBlockType1;
    2>          if upper layers provide the 'Registered MME',
            include and set the registeredMME as follows:
        3>      if the PLMN identity of the 'Registered MME' is
                different from the PLMN selected by the upper layers:
            4>      include the plmnIdentity in the
                    registeredMME and set it to the value of the
                    PLMN identity in the 'Registered MME' received
                    from upper layers;
        3> set the mmegi and the mmec to the value received from
            upper layers;
```

Combining network sharing and overload situation generates more cases to consider.

For instance, Operator-A and Operator-B are sharing the RAN node in country 1 as shown in FIG. 1. And Operator-C is serving the same area as Operators A and B but has his own RAN system. And Operator-A and Operator-B have own MTC customers but have different business models. Operator-A's MTC devices have Operator-A's Country-2 SIM/USIM (i.e, they are roamers in country 1), while Operator-B's MTC devices have Operator-B's Country-1 SIM/USIM (i.e., they are in their home network). And in case MME3 is broken, MTC devices of Operator-3 will try to roam to Operator-A/B's network which may cause overload. Thus EAB has to be set in eNB-a to prevent serving Operator-3's MTC devices while eNB-a still serves MTC devices of Operator-A/B as normal.

PLMN selection of Operator-C's MTC devices may vary depending on the settings of devices and the policy of Operator-C. They may select either PLMN1 or PLMN2. From Operator-A's point of view, Operator-C's MTC devices belong to category c) while from Operator-B's point of view Operator-C's MTC devices belong to category b). Thus with the current solution, if category b) is set for EAB in eNB-a, MTC devices of Operator-A will be also barred.

If category c) is set for EAB in eNB-a and PLMN2 is configured as preferred PLMN in Operator-C's MTC devices, Operator-C's MTC devices will be served if they select PLMN2.

Even though EAB is invented to prevent RAN overload, the same mechanism may be used for Core network overload mitigation. In this example, MTC business model is the same as the above. (i.e., Operator-A's MTC has roamers' SIM/USIM while Operator-B's MTC has home SIM/USIM)

As in FIG. 2, in case MME2 is heavily loaded, eNB will want to bar the MTC devices of Operator-B while Operator-A's MTC devices can be served normally. However if the category for the EAB is common for all PLMN in network sharing, eNB will not be able to bar only Operator-B's MTC devices as it has to bar Operator-B's MTC devices in category a) while serves normally Operator-A's MTC devices in category b). Such a scenario is described in CR 178 to 3GPP TS 22.011.

For Access Class Barring in LTE system, SIB broadcasts barring related parameters are as according to FIG. 10.

According to 3GPP TS 22.011 V11.0.0, section 4.3.1, for access class barring the UE determines the barring status with the information provided from the serving network, and performs the access attempt accordingly. The UE draws a uniform random number between 0 and 1 when initiating connection establishment and compares with the current barring rate to determine whether it is barred or not. When the uniform random number is less than the current barring rate and the type of access attempt is indicated allowed, then the access attempt is allowed; otherwise, the access attempt is not allowed. If the access attempt is not allowed, further access attempts of the same type are then barred for a time period that is calculated based on the 'mean duration of access control' provided by the network and the random number drawn by the UE.

Thus one could consider extending ACB parameters for EAB, as proposed in R2-113339 and R2-113217. Also for GERAN, some detailed solutions for EAB had been discussed in G2-110010, G2-110018, G2-110026.

However currently all access barring parameters in LTE are common to all PLMNs which share the RAN node. And none of the proposals clarifies how EAB should work in case of network sharing.

In UMTS, the concept of per-PLMN access class barring is present. The network may include a "Domain Specific Access Restriction For Shared Network" IE which includes one or several Domain Specific Access Restriction Parameters per PLMN in case of network sharing in SIB3. However, the "domain specific access Restriction" indicates whether the cell is barred or not for Access Class 0 up to Access class 15. That means the parameter indicates whether the cell is barred for UEs having a certain access class and having selected a certain PLMN. Thus, this concept would mix up the ideas of access class barring and EAB. Thus, the operator may not apply simultaneously access class barring to certain access classes and EAB to UEs of a certain roaming status reducing flexibility for the operator.

SUMMARY OF THE INVENTION

It is an object of the present invention to improve the prior art.

According to a first aspect of the invention, there is provided an apparatus, comprising base station means adapted to provide a base station functionality for a first user equipment attached to a first network and a second user equipment attached to a second network different from the first network; access barring broadcasting means adapted to broadcast, via the base station means, a first EAB parameter comprising a first category indication for extended access barring related to the first network and a second category indication for extended access barring related to the second network.

In the apparatus, the access barring broadcasting means may be adapted to broadcast a second EAB parameter comprising a common extended access barring parameter, wherein the common extended access parameter may be related to both the first network and the second network and may comprise at least one of a barring factor, a barring time, and a barring for special access classes information element.

In the apparatus, the base station means may be adapted to broadcast an information message comprising an indication of the first network and an indication of the second network, the indications being arranged in a network sequence; the access barring broadcasting means may be adapted to broadcast the first EAB parameter, in which the first category indication and the second category indication are arranged in a category sequence; and the category sequence may correspond to the network sequence.

In the apparatus, a value range of at least one of the first category indication and the second category indication may comprise a first category and a second category different from the first category, and, if a value of the at least one of the first category indication and the second category indication comprises the second category, the at least one of the first category indication and the second category indication may contain the second category and the first category.

The apparatus may comprise first inhibiting means adapted to inhibit the access barring broadcasting means to broadcast the first category indication if a value of the first category indication is a predefined category, wherein the access barring broadcasting means may be adapted to broadcast an extended access barring parameter comprising at least one of a barring factor, a barring time, and a barring for special access classes information element, wherein the extended access barring parameter may be related to the first network.

In the apparatus, the base station means may be adapted to attach to a first core network entity and a second core network entity of the first network, wherein the first core network entity may be different from the second core network entity, the apparatus may further comprise receiving means adapted to receive at least one of a third category indication from the first core network entity and a fourth category indication from the second core network entity; checking means adapted to check if at least one of the third category indication and the fourth category indication is not received; second inhibiting means adapted to inhibit the access barring broadcasting means to broadcast the first category indication if the checking means has checked that at least one of the third and fourth category indications is not received.

The apparatus may further comprise minimum finding means adapted to find, if the checking means has checked that both the third and fourth category indications are received, a minimum category out of values of the third and fourth category indications, and wherein the access barring broadcasting means may be adapted to broadcast the first category indication with a value of the minimum category.

The apparatus may further comprise load balancing means adapted to balance a load based on the received at least one of the third and fourth category indications.

According to a second aspect of the invention, there is provided an apparatus, comprising base station processor adapted to provide a base station functionality for a first user equipment attached to a first network and a second user equipment attached to a second network different from the first network; access barring broadcasting processor adapted to broadcast, via the base station processor, a first EAB parameter comprising a first category indication for extended access barring related to the first network and a second category indication for extended access barring related to the second network.

In the apparatus, the access barring broadcasting processor may be adapted to broadcast a second EAB parameter comprising a common extended access barring parameter, wherein the common extended access parameter may be related to both the first network and the second network and may comprise at least one of a barring factor, a barring time, and a barring for special access classes information element.

In the apparatus, the base station processor may be adapted to broadcast an information message comprising an indication of the first network and an indication of the second network, the indications being arranged in a network sequence; the access barring broadcasting processor may be adapted to broadcast the first EAB parameter, in which the first category indication and the second category indication are arranged in a category sequence; and the category sequence may correspond to the network sequence.

In the apparatus, a value range of at least one of the first category indication and the second category indication may comprise a first category and a second category different from the first category, and, if a value of the at least one of the first category indication and the second category indication comprises the second category, the at least one of the first category indication and the second category indication may contain the second category and the first category.

The apparatus may comprise first inhibiting processor adapted to inhibit the access barring broadcasting processor to broadcast the first category indication if a value of the first category indication is a predefined category, wherein the access barring broadcasting processor may be adapted to broadcast an extended access barring parameter comprising at least one of a barring factor, a barring time, and a barring for special access classes information element, wherein the extended access barring parameter may be related to the first network.

In the apparatus, the base station processor may be adapted to attach to a first core network entity and a second core network entity of the first network, wherein the first core network entity may be different from the second core network entity, the apparatus may further comprise receiving processor adapted to receive at least one of a third category indication from the first core network entity and a fourth category indication from the second core network entity; checking processor adapted to check if at least one of the third category indication and the fourth category indication is not received; second inhibiting processor adapted to inhibit the access barring broadcasting processor to broadcast the first category indication if the checking processor has checked that at least one of the third and fourth category indications is not received.

The apparatus may further comprise minimum finding processor adapted to find, if the checking processor has checked that both the third and fourth category indications are received, a minimum category out of values of the third and fourth category indications, and wherein the access barring broadcasting processor may be adapted to broadcast the first category indication with a value of the minimum category.

The apparatus may further comprise load balancing processor adapted to balance a load based on the received at least one of the third and fourth category indications.

According to a third aspect of the invention, there is provided a base station comprising an apparatus according to any of the first and second aspects.

According to a fourth aspect of the invention, there is provided an apparatus, comprising user equipment means adapted to access a base station device, to attach to a first network via the base station device, and to receive, from the base station device, a first EAB parameter comprising a first category indication related to the first network and a second category indication related to a second network different from the first network; evaluating means adapted to evaluate a category from the first EAB parameter based on the first category indication; checking means adapted to check, if the apparatus belongs to the category, and, if affirmative, to obtain a positive result; applying means adapted to apply extended access barring to the access of the user equipment means to the base station device if the result of the checking means is positive.

In the apparatus, the user equipment means may be further adapted to receive a second EAB parameter from the base station device, the apparatus may further comprise parameter obtaining means adapted to obtain a common extended access barring parameter from the second EAB parameter, wherein the common extended access barring parameter may be related to both of the first network and the second network and may comprise at least one of a barring factor, a barring time, and a barring for special access classes information element.

In the apparatus, the user equipment means may be further adapted to receive an indication of the first network and an indication of the second network in an information message received from the base station device, the apparatus may further comprise sequence obtaining means adapted to obtain a network sequence from an arrangement of the indication of the first network and the indication of the second network in the information message; wherein the first category indication and the second category indication in the first EAB parameter are arranged in a category sequence, and the evaluating means may be adapted to identify the category indication related to the first network assuming that the network sequence corresponds to the category sequence.

In the apparatus, a value range of the first category indication may comprise a first category and a second category different from the first category, wherein the checking means may be additionally adapted to obtain the positive result if the apparatus belongs to the first category and the evaluated category comprises the second category.

In the apparatus, the user equipment means may be further adapted to receive an extended access barring parameter comprising at least one of a barring factor, a barring time, and a barring for special access classes information element, wherein the extended access barring parameter may be related to the first network, the checking means may be adapted to check, if the first category indication is not received, if the apparatus belongs to a predefined category, and, if affirmative, to obtain the positive result.

According to a fifth aspect of the invention, there is provided an apparatus, comprising user equipment processor adapted to access a base station device, to attach to a first network via the base station device, and to receive, from the base station device, a first EAB parameter comprising a first category indication related to the first network and a second category indication related to a second network different from the first network; evaluating processor adapted to evaluate a category from the first EAB parameter based on the first category indication; checking processor adapted to check, if the apparatus belongs to the category, and, if affirmative, to obtain a positive result; applying processor adapted to apply extended access barring to the access of the user equipment processor to the base station device if the result of the checking processor is positive.

In the apparatus, the user equipment processor may be further adapted to receive a second EAB parameter from the base station device, the apparatus may further comprise parameter obtaining processor adapted to obtain a common extended access barring parameter from the second EAB parameter, wherein the common extended access barring parameter may be related to both of the first network and the second network and may comprise at least one of a barring factor, a barring time, and a barring for special access classes information element.

In the apparatus, the user equipment processor may be further adapted to receive an indication of the first network and an indication of the second network in an information message received from the base station device, the apparatus may further comprise sequence obtaining processor adapted to obtain a network sequence from an arrangement of the indication of the first network and the indication of the second network in the information message; wherein the first category indication and the second category indication in the first EAB parameter are arranged in a category sequence, and the evaluating processor may be adapted to identify the category indication related to the first network assuming that the network sequence corresponds to the category sequence.

In the apparatus, a value range of the first category indication may comprise a first category and a second category different from the first category, wherein the checking processor may be additionally adapted to obtain the positive result if the apparatus belongs to the first category and the evaluated category comprises the second category.

In the apparatus, the user equipment processor may be further adapted to receive an extended access barring parameter comprising at least one of a barring factor, a barring time, and a barring for special access classes information element, wherein the extended access barring parameter may be related to the first network, the checking processor may be adapted to check, if the first category indication is not received, if the apparatus belongs to a predefined category, and, if affirmative, to obtain the positive result.

According to a sixth aspect of the invention, there is provided a user equipment comprising an apparatus according to any of the fourth and fifth aspects.

According to a seventh aspect of the invention, there is provided an apparatus, comprising mobility management means adapted to provide a mobility management to a user equipment attached to the mobility management entity means via a base station device, and indicating means adapted to indicate a category for extended access barring to the base station device.

According to an eighth aspect of the invention, there is provided an apparatus, comprising mobility management processor adapted to provide a mobility management to a user equipment attached to the mobility management entity processor via a base station device, and indicating processor adapted to indicate a category for extended access barring to the base station device.

According to a ninth aspect of the invention, there is provided a system, comprising a base station apparatus according to any of the first and second aspects; a user equipment apparatus according to any of the fourth and fifth aspects; wherein the user equipment apparatus comprises the first user equipment of the base station apparatus and is attached to the first network of the base station apparatus; and the first EAB parameter received by the user equipment apparatus comprises the first EAB parameter broadcasted by the base station apparatus.

According to a tenth aspect of the invention, there is provided a method, comprising providing a base station functionality for a first user equipment attached to a first network and a second user equipment attached to a second network different from the first network; broadcasting, using the base station functionality, a first EAB parameter comprising a first category indication for extended access barring related to the first network and a second category indication for extended access barring related to the second network.

The method may be a method of a base station.

The method may further comprise broadcasting a second EAB parameter comprising a common extended access barring parameter, wherein the common extended access parameter may be related to both the first network and the second network and may comprise at least one of a barring factor, a barring time, and a barring for special access classes information element.

The method may further comprise broadcasting an information parameter comprising an indication of the first network and an indication of the second network, the indications being arranged in a network sequence; wherein the first category indication and the second category indication are arranged in a category sequence in the first EAB parameter; and the category sequence may correspond to the network sequence.

In the method, a value range of at least one of the first category indication and the second category indication may comprise a first category and a second category different from the first category, and, if a value of the at least one of the first category indication and the second category indication comprises the second category, the at least one of the first category indication and the second category indication may contain the second category and the first category.

The method may comprise inhibiting broadcasting the first category indication if a value of the first category indication is a predefined category, and broadcasting an extended access barring parameter comprising at least one of a barring factor, a barring time, and a barring for special access classes information element, wherein the extended access barring parameter may be related to the first network.

In the method, the apparatus performing the method may be attached to a first core network entity and a second core network entity of the first network, wherein the first core network entity may be different from the second core network entity, the method may further comprise receiving at least one of a third category indication from the first core network entity and a fourth category indication from the second core network entity; checking if one of the third category indication and the fourth category indication is not received; inhibiting broadcasting the first category indication if it is checked that one of the third and fourth category indications is not received.

The method may further comprise finding, if it is checked that both the third and fourth category indications are received, a minimum category out of values of the third and fourth category indications, and broadcasting the first category indication with a value of the minimum category.

The method may further comprise balancing a load based on the received at least one of the third and fourth category indications.

According to an eleventh aspect of the invention, there is provided a method, comprising accessing a base station device, attaching to the first network via the base station device; receiving, from the base station device, a first EAB parameter comprising a first category indication related to the first network and a second category indication related to a second network different from the first network, evaluating a category from the first EAB parameter based on the first category indication; checking, if the apparatus performing the method belongs to the category and, if affirmative, obtaining a positive result; and applying extended access barring to the access to the base station device if the result of the checking is positive.

The method may be a method of a user equipment.

The method may further comprise receiving a second EAB parameter from the base station device, and obtaining a common extended access barring parameter from the second EAB parameter, wherein the common extended access barring parameter may be related to both of the first network and the second network and may comprise at least one of a barring factor, a barring time, and a barring for special access classes information element.

The method may further comprise receiving an indication of the first network and an indication of the second network in an information parameter received from the base station device, obtaining a network sequence from an arrangement of the indication of the first network and the indication of the second network in the information parameter; wherein the first category indication and the second category indication in the first EAB parameter are arranged in a category sequence, and the evaluating may be adapted to identify the category indication related to the first network assuming that the category sequence corresponds to the network sequence.

In the method, a value range of the first category indication may comprise a first category and a second category different from the first category, the method further may comprise obtaining the positive result if the apparatus performing the method belongs to the first category and the evaluated category comprises the second category.

The method may further comprise receiving an extended access barring parameter comprising at least one of a barring factor, a barring time, and a barring for special access classes information element, wherein the extended access barring parameter may be related to the first network, and checking, if the first category indication is not received, if the apparatus belongs to a predefined category, and, if affirmative, obtaining the positive result.

According to a twelfth aspect of the invention, there is provided a method, comprising providing a mobility management to a user equipment attached to an apparatus performing the providing via a base station device, and indicating a category for extended access barring to the base station device.

According to a thirteenth aspect of the invention, there is provided a computer program product including a program comprising software code portions being arranged, when run on a processor of an apparatus, to perform the method according to any one of the tenth to twelfth aspects.

The computer program product may comprise a computer-readable medium on which the software code portions are stored, and/or the program may be directly loadable into a memory of the processor.

According to embodiments of the invention, at least the following advantages are achieved:

Overload in the RAN may be efficiently mitigated according to the defined categories also in case of network sharing. Flexibility of the operator is enhanced. Access classes are not involved and, thus, may be treated independently from EAB. Nevertheless, signaling load may be reduced by using common EAB parameters for different core networks and/or by applying more elaborated less consuming signaling schemes. On the other hand, by some signaling schemes, the processing power on the base stations or user equipment needed for EAB signaling may be reduced.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein

FIG. 4 shows an apparatus according to an embodiment of the invention;

FIG. 5 shows a method according to an embodiment of the invention;

FIG. 6 shows an apparatus according to an embodiment of the invention;

FIG. 7 shows a method according to an embodiment of the invention;

FIG. 8 shows an exemplary SIB1 in case of network sharing (pseudo-code);

FIG. 9 shows an exemplary RRCConnectionSetupComplete message in case of network sharing (pseudo-code);

FIG. 10 shows an exemplary SIB2 in case of access class barring (pseudo-code);

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

This invention report proposes a way of efficient RRC signaling to realize EAB in case of network sharing.

To realize the EAB, the network may broadcast something similar to ac-BarringFactor, ac-BarringTime and ac-BarringForSpecialAC for EAB and an indication of category indicating whether the barring is applied to UEs belonging to category a) or b) or c). For example, ac-BarringFactor may be an ON/OFF type of indication or, in some embodiments, it may be not needed to further save signalling. Also ac-BarringForSpecialAC may not be needed if EAB is never configured for UEs having access class 11-15.

To simplify the configuration but to support network sharing with EAB, according to some embodiments of the invention, the EAB configuration (i.e, eab-Barring Factor (or ON/OFF indication) and eab-barring timer and potentially eab-BarringForSepcialAC) may be signalled common for all PLMNs if SIB1 broadcasts multiple PLMNs but the categories to apply EAB may be signalled per PLMN. However, in some embodiments, the category indications may not be signalled in the same message as the PLMN list indicating the PLMNs sharing the base station. For example, the PLMN list may be signalled in SIB1 and the category indications may be signalled in SIB2 or a new SIB. In case the UE NAS chooses a PLMN and indicates it to AS with which category UE belonging to (either in a separate indicator or as a part of call type), that PLMN will be the subject of EAB according to the category signalled in the system information with the rest of the EAB configuration.

Figures 11, 12, 13:
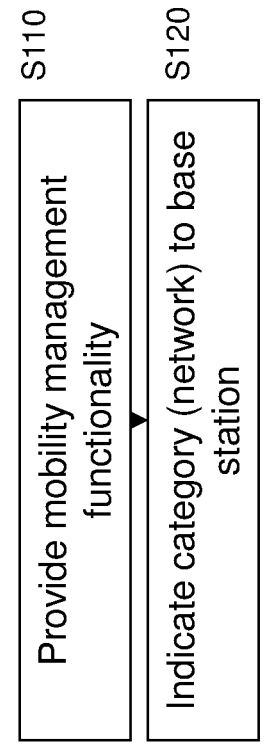
FIG. 11 shows EAB-BarringConfig according to an embodiment of the invention (pseudo-code)
FIG. 12 shows an apparatus according to an embodiment of the invention.
FIG. 13 shows a method according to an embodiment of the invention.

In case, eab-BarringFactor is signalled instead of ON/OFF indication and AC 11-15 may have EAB as well, one example signalling according to an embodiment of the invention could be as shown in FIG. 11. In this embodiment, first entry of UE-EAB-Category corresponds to the first entry of PLMN-Identity listed in the SIB1, second entry of UE-EAB-Category corresponds to the second entry of PLMN-Identity listed in the SIB1, and so on.

Figure 1:
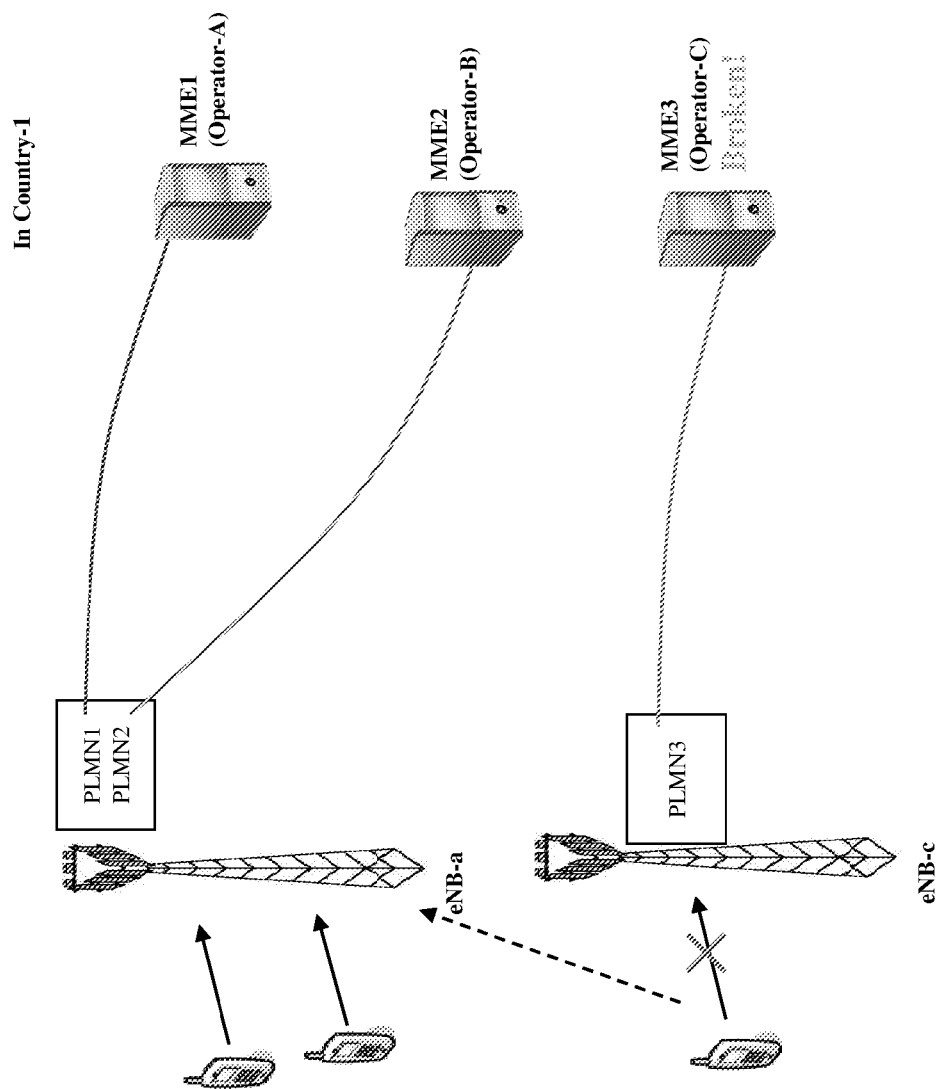
FIG. 1 shows an exemplary shared network configuration.
Figure 2:
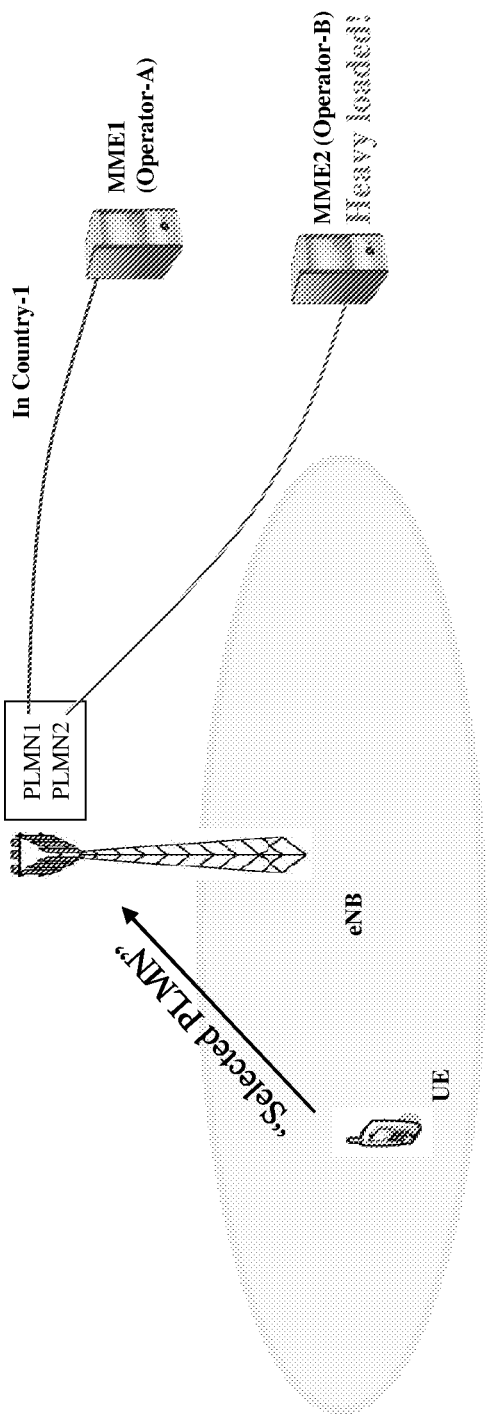
FIG. 2 shows another exemplary shared network configuration.
Figure 3:
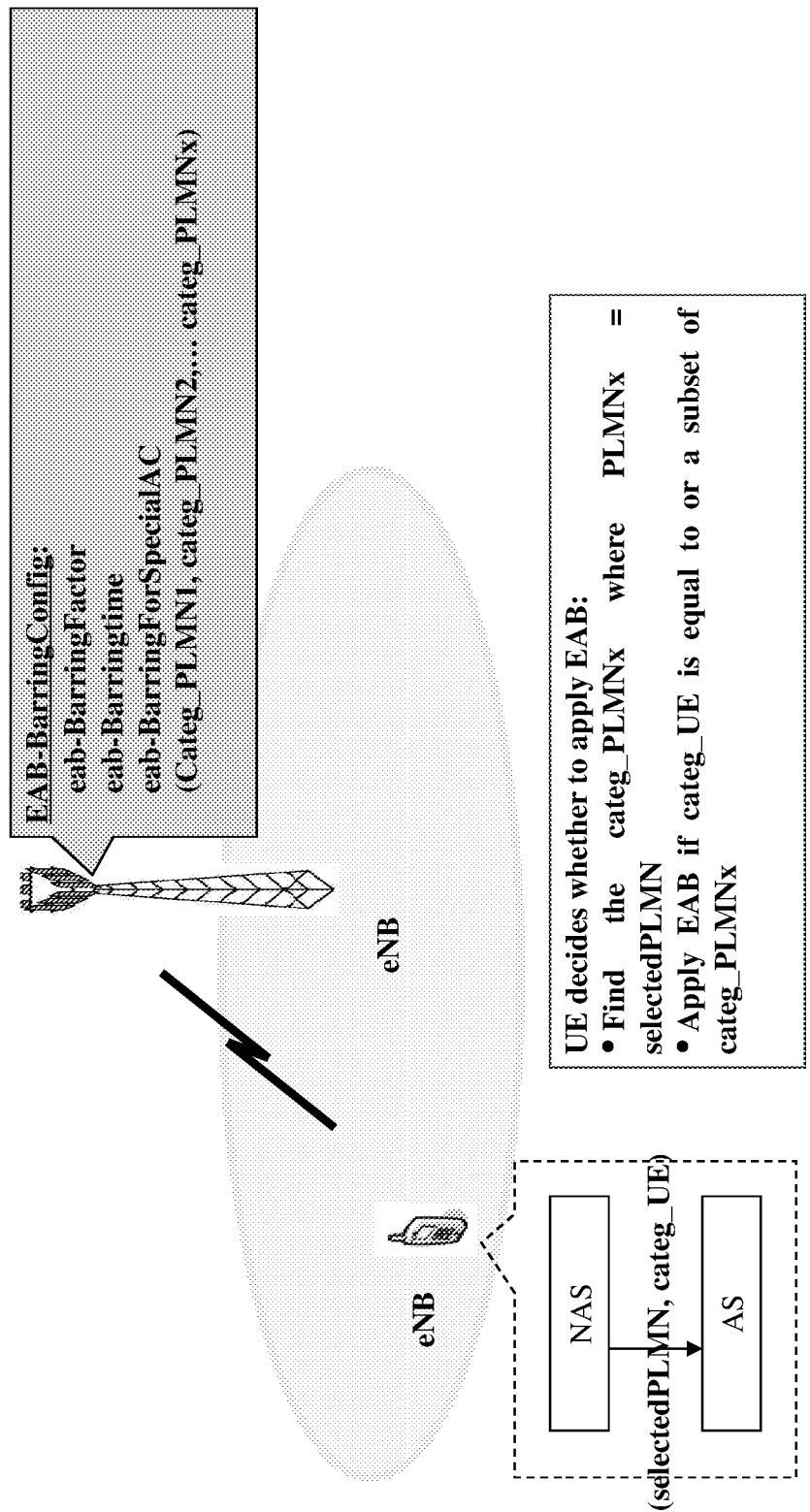
FIG. 3 shows a network configuration according to an embodiment of the invention.

Thus, for instance, if SIB1 includes three PLMN-Identities (e.g. PLMN1, PLMN2 and PLMN3), UE NAS layer may select e.g. PLMN2 to register and indicates that the UE belonging to category b, network broadcasts EAB-BarringConfig with eab-PLMN-Info as {categ-a, categ-b, categ-b}, UE applies EAB according to the rest of EAB-BarringConfiguration. As UE category b) belongs to a) and c) belongs to b) and a), in the above example, if NAS selects PLMN2 to register and indicates that UE belonging to category c), UE still should apply the EAB according to the rest of the EAB-BarringConfiguration parameter. However, depending on the definition of category bit in the signalling, the details may vary. All in all, the UE behaviour is shown in FIG. 3. Based on the indication from NAS to AS, and the EAB-BarringConfig advertised from SIB, UE could decide whether to apply EAB.

Instead of a 1:1 correspondence of the sequences of the PLMN identities in the SIB and the sequence of categories, in some embodiments there may be other correspondences such that e.g. the sequence of categories is reversed or cyclically shifted compared to the sequence of PLMN identities.

The name of the respective information elements, the implementations, and value ranges may be different from those shown herein. In general, they preferably may be specified by 3GPP.

If ON/OFF type of signalling is used instead of eab-BarringFactor, in some embodiments of the invention eab-BarringFactor may be replaced with

|   | eab-Barring | BOOLEAN, |
|---|---|---|
| or | eab-Barring | ENUMERATED {barred} OPTIONAL, |

Alternatively, in some embodiments of the invention, eab-BarringFactor may be removed and the network may indicate that EAB is activated by including EAB-BarringConfig with other configuration messages. Thus EAB-BarringConfig becomes OPTIONAL in this case.

Also for EAB-PLMN-Info, in some embodiments of the invention, eab-PLMN-List may have the list of SEQUENCE and ue-EAB-Category has only two values as below, wherein ue-EAB-Category is optional.

```
eab-PLMN-List ::=        SEQUENCE (SIZE (1..6)) OF
    EAB-PLMN-Info
    EAB-PLMN-Info ::=SEQUENCE {
        ue-EAB-Category   ENUMERATED { categ-b, categ-c }
        OPTIONAL
    }
```

As by default, according to this embodiment, if EAB-BarringConfig is signalled, all the UEs belonging to categ-a should apply EAB. Thus, with this signalling, network does not need to signal the category explicitly if PLMN wants to bar categ-a UEs. Thus with above example, eab-PLMN-Info will broadcast {NULL, categ-b, categ-b} if network wants to bar category-a) UEs in PLMN1 and category-b) UEs in PLMN2 and PLMN3. However in this signalling, the number of PLMNs broadcast in the SIB1 and the number of entries in eab-PLMN-Info should be the same if the association between category in PLMN is based on their respective sequences. In some other embodiments, EAB-PLMN-Info may includes the number (1.6) to indicate which PLMN in the SIB1 is linked to UEEAB-Category information.

If there are more than three categories, and/or if the default is one of the other categories, the same principle may apply wherein the value range of two categories {categ-b, categ-c} as according to the above embodiment may comprise all the categories except for one which is the default category.

Since the UE NAS indicates to AS is category a), b) or c), a problem may arise how the UE maps its category with the category information included in EAB from the network. For example, if the EAB corresponding to the PLMN selected by the UE indicates "categ-b", and UE NAS indicates to AS shows "categ-c", should the UE apply the EAB or not?

Since category c) is a subset of category b), and category b) is a subset of category a), in some embodiments the UE may apply the EAB as long as its category is equal to or a subset of the category indicated in the EAB information, as shown in FIG. 3.

According to these embodiments, some mapping rules may be defined at UE.

According to other embodiments, in order to simplify UE's behaviour, one more variation of category signalling may be given as follows, so that UE could just read the category information in EAB and check whether its category is included.

```
EAB-PLMN-Info ::=SEQUENCE {
    ue-EAB-Category ENUMERATED {categ-abc, categ-bc-Only,
    categ-c-Only, spare}
}
```

In embodiments employing this signalling, UE may apply the category information in the EAB configuration directly and does not need to deduce whether it is a subset of the category in the signalling. Thus, if "categ-abc" is indicated for a certain PLMN, EAB-BarringConfig is applicable to UEs of category a) and b) and c) in that PLMN. If "categbc-Only" is indicated for a certain PLMN, EAB-BarringConfig is applicable only for UEs of category b) and c) but not for category a) UEs for that PLMN. And if "categ-c-Only" is indicated for a certain PLMN, EAB-BarringConfig is applicable to UEs of category c) only but not to UEs of category a) and b) for that PLMN.

Also if more flexibility is required and operators want to apply the EAB only to certain PLMNs but not all the PLMNs sharing the RAN node, in some embodiments more value can be added by the category value like "no barring". By adding this no-barring, network can set EAB only for a few PLMNs in case of network sharing.

| UE-EAB-Category ENUMERATED {categ-a, categ-b, categ-c, no-barring} |
| --- |

The EAB parameters can be configured by O&M or based on the overload indication from core network. If more accurate indication is necessary to set the EAB in eNB, MME may need to signal which category it would like to bar for EAB and based on this information eNB set the EAB per category.

For example, if several MMEs belong to one PLMN, and eNB receives different categories from some of the MMEs belonging to the one PLMN, eNB may decide depending on the MME capabilities in the MME pool of the PLMN. If other—non congested—MME can serve the device, eNB may not set the barring category as requested by the some MMEs but eNB may apply load balancing procedure and does not forward the connection request to the MME that indicated an EAB category.

In some embodiments, the eNB may find out the minimum category of the received categories. The minimum category is a category where barring is applied to the smallest number of user equipments. For example, if one MME indicates category a and another indicates category b, category b is the minimum category because each UE belonging to category b belongs to category a, too, but not vice versa. In other words, the minimum category defines the smallest sub-set. Then, the eNB may send an EAB indication with category b (the minimum category), and apply load balancing such that the connection requests are preferably forwarded to the MME indicating the minimum category. (i.e, MME indicating category b in the example).

If, in the MME pool, only one MME can serve the EAB configured devices and that MME sends an EAB indication to eNB, then eNB may set the EAB configuration accordingly.

If an MME belongs to different PLMNs, eNB may just set the parameter per PLMN accordingly in the EAB configuration and broadcasts it.

FIG. 4 shows an apparatus according to an embodiment of the invention. The apparatus may be a base station such as an eNodeB. FIG. 5 shows a method according to an embodiment of the invention. The apparatus according to FIG. 4 may perform the method of FIG. 5 but is not limited to this method. The method of FIG. 5 may be performed by the apparatus of FIG. 5 but is not limited to being performed by this apparatus.

The apparatus comprises base station means 10, and access barring broadcasting means 20.

The base station means 10 provides base station functionality for user equipments attached to different networks (S10). The access barring broadcasting means 20 broadcasts, via the base station functionality, an EAB parameter wherein the categories are related to the different networks (S20).

FIG. 6 shows an apparatus according to an embodiment of the invention. The apparatus may be a terminal such as a user equipment. FIG. 7 shows a method according to an embodiment of the invention. The apparatus according to FIG. 6 may perform the method of FIG. 7 but is not limited to this method. The method of FIG. 7 may be performed by the apparatus of FIG. 6 but is not limited to being performed by this apparatus.

The apparatus comprises user equipment means 60, evaluating means 70, checking means 80, and applying means 90.

The user equipment means 60 may access a base station, attach to a network via the base station, and receive messages from the base station. One of these messages may contain an EAB parameter comprising several category indications related to several networks (S60). The evaluating means 70 evaluates the category from the category indication related to the network to which the apparatus is attached (S70). The checking means 80 checks whether the apparatus belongs to the evaluated category (S80). If the check result is affirmative, the applying means 90 applies EAB to the user equipment means (S90).

FIG. 12 shows an apparatus according to an embodiment of the invention. The apparatus may be a mobility management entity such as an MME. FIG. 13 shows a method according to an embodiment of the invention. The apparatus according to FIG. 12 may perform the method of FIG. 13 but is not limited to this method. The method of FIG. 13 may be performed by the apparatus of FIG. 12 but is not limited to being performed by this apparatus.

The apparatus comprises mobility management means 110, and indicating means 120.

The mobility management means 110 provides a mobility management functionality for user equipment attached to a core network to which the mobility management means belongs (S110). The mobility management means may belong to more than one core network. The user equipment are attached to their respective core network via a base station. The indicating means 120 indicates to the base station an EAB category related to the core network (S120).

Embodiments of the invention are described based on an LTE system but embodiments of the invention may be applied to UMTS or any other radio access network (e.g. GERAN, EDGE) where EAB and network sharing may be employed.

According to current LTE standards, up to 6 PLMNs may share an access network. However, the number of six is not a limitation for the present invention. In embodiments of the invention, any number of core networks may share a certain radio access network.

In some embodiments of the invention, the networks sharing the radio access network, in particular the base station, are PLMNs. In some embodiments, private networks or a mixture of public and private networks may share the base station.

In some embodiments, the networks sharing the base station may also share their core networks, that is one core network of several networks (e.g. PLMNs) is attached to the base station. In some embodiments, at least some of the networks may have their own core network, and several core networks are attached to the base station.

In some embodiments of the invention, the categories and the other EAB parameters are broadcasted in different messages, while they may be broadcasted in the same message in other embodiments.

In some embodiments of the invention, a machine type communication (MTC) device is employed. In other embodiments, any terminal of the respective access technology such as a mobile phone, a laptop, a smart phone, and a user equipment may be employed.

If not otherwise stated or otherwise made clear from the context, the statement that two entities are different means that they are differently addressed in the mobile network. It does not necessarily mean that they are based on different hardware. That is, each of the entities described in the present description may be based on a different hardware, or some or all of the entities may be based on the same hardware.

According to the above description, it should thus be apparent that exemplary embodiments of the present invention provide, for example a base station, or a component thereof, an apparatus embodying the same, a method for controlling and/or operating the same, and computer program(s) controlling and/or operating the same as well as mediums carrying such computer program(s) and forming computer program product(s). Further exemplary embodiments of the present invention provide, for example a user equipment, or a component thereof, an apparatus embodying the same, a method for controlling and/or operating the same, and computer program(s) controlling and/or operating the same as well as mediums carrying such computer program(s) and forming computer program product(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:
1. Apparatus, comprising
a device configured to provide access to a user equipment to attach to a first network via the device; and
an access barring broadcaster configured to broadcast, via the device, a first extended access barring parameter comprising a first category indication related to the first network and a second category indication related to a second network different from the first network, wherein the access barring broadcaster is configured to broadcast a second extended access barring parameter comprising a common extended access barring parameter, wherein the common extended access parameter is related to both the first network and the second network and comprises at least one of a barring factor, a barring time, and a barring for special access classes information element;
wherein the first extended access barring parameter is indicative to the user equipment to:
evaluate a category from the first extended access barring parameter based on the first category indication;
check, if the user equipment belongs to the category, and, if affirmative, to obtain a positive result;
apply extended access barring to the access of the user equipment to the device if the result of the check is positive.

2. Apparatus according to claim 1, wherein
the device is configured to broadcast an information message comprising an indication of the first network and an indication of the second network, the indications being arranged in a network sequence;
the access barring broadcaster is configured to broadcast the first extended access barring parameter, in which the first category indication and the second category indication are arranged in a category sequence; and
the category sequence corresponds to the network sequence.

3. Apparatus according to claim 1, wherein
a value range of at least one of the first category indication and the second category indication comprises a first category and a second category different from the first category, and,
if a value of the at least one of the first category indication and the second category indication comprises the second category, the at least one of the first category indication and the second category indication contains the second category and the first category.

4. Apparatus according to claim 1, comprising
a first inhibitor configured to inhibit the access barring broadcaster to broadcast the first category indication if a value of the first category indication is a predefined category, wherein
the access barring broadcaster is configured to broadcast an extended access barring parameter comprising at least one of a barring factor, a barring time, and a barring for special access classes information element, wherein the extended access barring parameter is related to the first network.

5. Apparatus according to claim 1, wherein
the device is configured to attach to a first core network entity and a second core network entity of the first network, wherein the first core network entity is different from the second core network entity, the apparatus further comprising
a receiver configured to receive at least one of a third category indication from the first core network entity and a fourth category indication from the second core network entity;
a category checker configured to check if at least one of the third category indication and the fourth category indication is not received;
a second inhibitor configured to inhibit the access barring broadcaster to broadcast the first category indication if the category checker has checked that at least one of the third and fourth category indications is not received.

6. Apparatus according to claim 5, further comprising
a minimum finder configured to find, if the category checker has checked that both the third and fourth category indications are received, a minimum category out of values of the third and fourth category indications, and wherein
the access barring broadcaster is configured to broadcast the first category indication with a value of the minimum category.

7. Apparatus according to claim 5, further comprising
a load balancer configured to balance a load based on the received at least one of the third and fourth category indications.

8. An apparatus according to claim 1, wherein the category is one or more of:

the user equipment being configured for extended access barring;

the user equipment being configured for extended access barring, and the first network neither being the home public land mobile network of the user equipment, nor being equivalent to the home public land mobile network of the user equipment;

the user equipment being configured for extended access barring, and the first network neither being the home public land mobile network of the user equipment, nor being equivalent to the home public land mobile network of the user equipment, nor being the public land mobile network listed as most preferred public land mobile network of the country where the user equipment is roaming in the operator-defined public land mobile network selector list on the SIM or USIM.

9. Apparatus, comprising a user equipment configured to access a base station device, to attach to a first network via the base station device, and to receive, from the base station device, a first extended access barring parameter comprising a first category indication related to the first network and a second category indication related to a second network different from the first network, the user equipment being further configured to receive a second extended access barring parameter from the base station device;

an evaluator configured to evaluate a category from the first extended access barring parameter based on the first category indication;

a category checker configured to check, if the apparatus belongs to the category, and, if affirmative, to obtain a positive result;

an extended access barring applier configured to apply extended access barring to the access of the user equipment to the base station device if the result of the category checker is positive; and a parameter obtainer configured to obtain a common extended access barring parameter from the second extended access barring parameter, wherein the common extended access barring parameter is related to both of the first network and the second network and comprises at least one of a barring factor, a barring time, and a barring for special access classes information element.

10. Apparatus according to claim 9, wherein the user equipment is further configured to receive an indication of the first network and an indication of the second network in an information message received from the base station device, the apparatus further comprising a sequence obtainer configured to obtain a network sequence from an arrangement of the indication of the first network and the indication of the second network in the information message; wherein the first category indication and the second category indication in the first extended access barring parameter are arranged in a category sequence, and the evalutator is configured to identify the category indication related to the first network assuming that the network sequence corresponds to the category sequence.

11. Apparatus according to claim 9, wherein a value range of the first category indication comprises a first category and a second category different from the first category, wherein the category checker is additionally configured to obtain the positive result if the apparatus belongs to the first category and the evaluated category comprises the second category.

12. Apparatus according to claim 9, wherein the user equipment is further configured to receive an extended access barring parameter comprising at least one of a barring factor, a barring time, and a barring for special access classes information element, wherein the extended access barring parameter is related to the first network, the category checker is configured to check, if the first category indication is not received, if the apparatus belongs to a predefined category, and, if affirmative, to obtain the positive result.

13. An apparatus according to claim 9, wherein the category is one or more of:

the apparatus being configured for extended access barring;

the apparatus being configured for extended access barring, and the first network neither being the home public land mobile network of the apparatus, nor being equivalent to the home public land mobile network of the apparatus;

the apparatus being configured for extended access barring, and the first network neither being the home public land mobile network of the apparatus, nor being equivalent to the home public land mobile network of the apparatus, nor being the public land mobile network listed as most preferred public land mobile network of the country where the apparatus is roaming in the operator-defined public land mobile network selector list on the SIM or USIM.

14. Method, comprising providing a base station functionality to provide access to a user equipment to attach to a first network using the base station functionality; and broadcasting, using the base station functionality, a first extended access barring parameter comprising a first category indication related to the first network and a second category indication related to a second network different from the first network, wherein a second extended access barring parameter is broadcast comprising a common extended access barring parameter, wherein the common extended access parameter is related to both the first network and the second network and comprises at least one of a barring factor, a barring time, and a barring for special access classes information element;

wherein the first extended access barring parameter is indicative to the user equipment to:

evaluate a category from the first extended access barring parameter based on the first category indication;

check, if the user equipment belongs to the category, and, if affirmative, to obtain a positive result;

apply extended access barring to the access of the user equipment to the base station device if the result of the check is positive.

15. A method according to claim 14, wherein the category is one or more of:

the user equipment being configured for extended access barring;

the user equipment being configured for extended access barring, and the first network neither being the home public land mobile network of the user equipment, nor being equivalent to the home public land mobile network of the user equipment;

the user equipment being configured for extended access barring, and the first network neither being the home public land mobile network of the user equipment, nor being equivalent to the home public land mobile network of the user equipment, nor being the public land mobile network listed as most preferred public land mobile network of the country where the user equipment is roaming in the operator-defined public land mobile network selector list on the SIM or USIM.

16. Method, comprising accessing a base station device, attaching to the first network via the base station device;

receiving, from the base station device, a first extended access barring parameter comprising a first category indication related to the first network and a second category indication related to a second network different from the first network, evaluating a category from the first extended access barring parameter based on the first category indication;

checking, if the apparatus performing the method belongs to the category and, if affirmative, obtaining a positive result;

applying extended access barring to the access to the base station device if the result of the checking is positive; and obtaining a common extended access barring parameter from the second extended access barring parameter, wherein the common extended access barring parameter is related to both of the first network and the second network and comprises at least one of a barring factor, a barring time, and a barring for special access classes information element.

17. A method according to claim 16, wherein the category is one or more of:

the apparatus being configured for extended access barring;

the apparatus being configured for extended access barring, and the first network neither being the home public land mobile network of the apparatus, nor being equivalent to the home public land mobile network of the apparatus;

the apparatus being configured for extended access barring, and the first network neither being the home public land mobile network of the apparatus, nor being equivalent to the home public land mobile network of the apparatus, nor being the public land mobile network listed as most preferred public land mobile network of the country where the apparatus is roaming in the operator-defined public land mobile network selector list on the SIM or USIM.

18. A computer program product embodied in a non-transitory computer memory and comprising instructions the execution of which by a processor results in performing operations that comprise:

accessing a base station device, attaching to the first network via the base station device;

receiving, from the base station device, a first extended access barring parameter comprising a first category indication related to the first network and a second category indication related to a second network different from the first network, evaluating a category from the first extended access barring parameter based on the first category indication;

checking, if the apparatus performing the method belongs to the category and, if affirmative, obtaining a positive result;

applying extended access barring to the access to the base station device if the result of the checking is positive; and obtaining a common extended access barring parameter from the second extended access barring parameter, wherein the common extended access barring parameter is related to both of the first network and the second network and comprises at least one of a barring factor, a barring time, and a barring for special access classes information element.

* * * * *